United States Patent Office 3,367,692
Patented Feb. 6, 1968

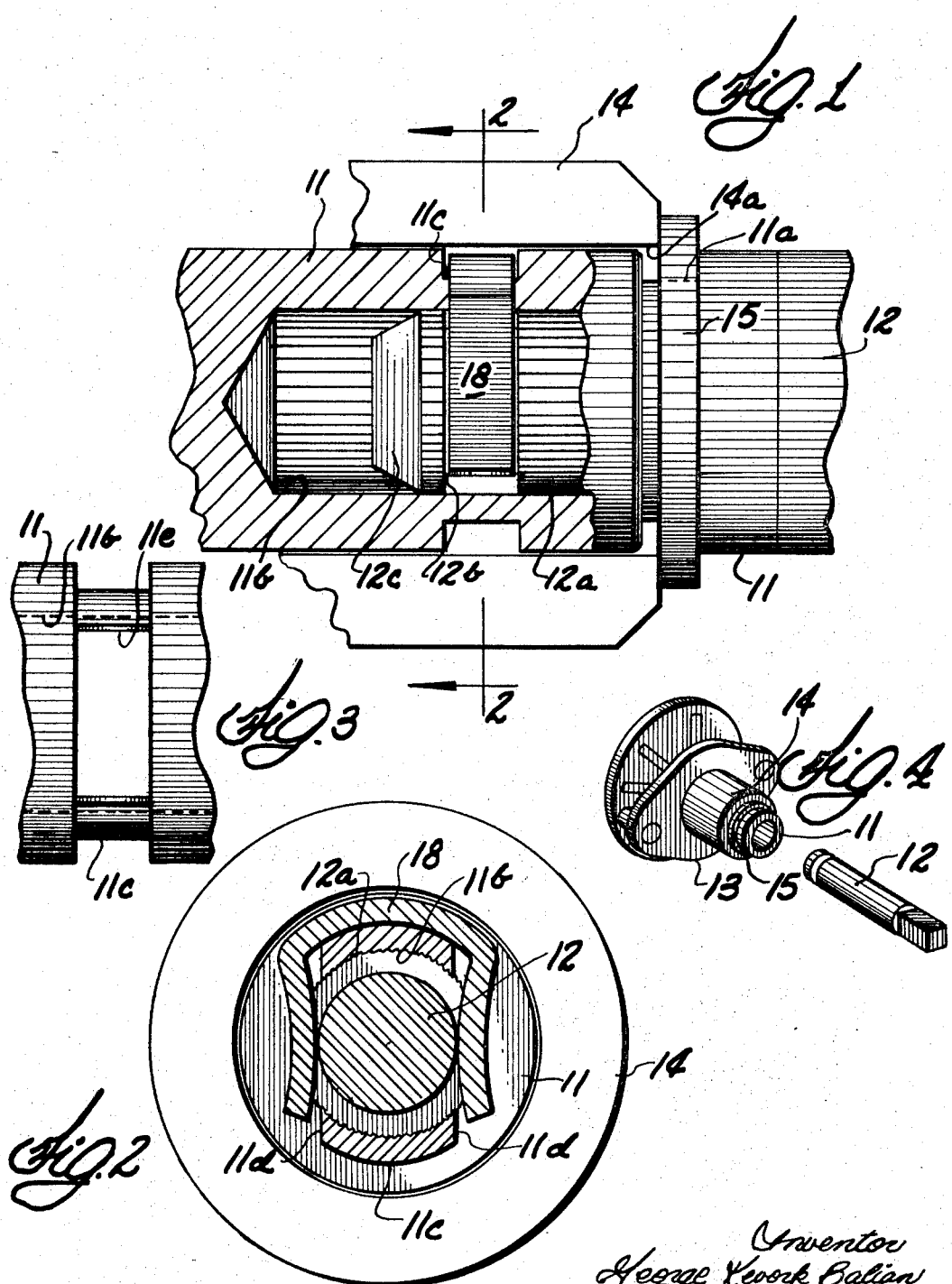

3,367,692
SHAFT CONSTRUCTION
George Kevork Balian, Greenfield, Wis., assignor to Globe-Union Inc., Milwaukee, Wis., a corporation of Delaware
Filed Sept. 20, 1965, Ser. No. 488,700
9 Claims. (Cl. 287—103)

ABSTRACT OF THE DISCLOSURE

A shaft construction, especially for electronic components, wherein two coaxial sections are adapted for easy assembly and are resiliently interlocked against relative axial movement and against relative rotation.

---

The present invention relates generally to a shaft construction and more specifically to a shaft member including a pair of shaft sections which are adapted to be connected together for concurrent rotational movement.

In various electrical or electronic applications, various size shafts or shaft extensions are to be connected to the shafts of standard control components, such as switches, so that the component shafts and the shafts or shaft extensions rotate concurrently. Such connections are presently formed by cementing. However, this type of a connection has various drawbacks. For example, the shafts cannot readily be angularly indexed and the connecting operation is slower and more difficult than is desired. Consequently, it has been desirable to provide a new and improved arrangement for interconnecting pairs of shafts which overcomes these drawbacks.

A primary object of the present invention is to provide a new and improved shaft construction. More specifically, it is an object to provide a new and improved shaft construction including a pair of shafts or shaft sections which are adapted to be connected together for concurrent rotational movement. In this connection, it is an object to provide a new and improved arrangement for interconnecting a pair of shafts or shaft sections.

Another object is to provide a new and improved shaft construction including a pair of shafts or shaft sections wherein the shafts or shaft sections may be readily connected together and may be readily angularly indexed relative to one another. More specifically, it is an object to provide such as shaft construction wherein one shaft or section has an axial opening adapted to receive an axial extension of the other shaft or section and wherein means are provided for preventing axial movement between the shafts or sections once the shafts or sections are moved into abutting relationship. A further object is to provide such an arrangement wherein means are provided for preventing relative rotational movement between the shafts or sections and thus for causing the shafts or sections to rotate concurrently.

A general object of the present invention is to provide a new and improved shaft construction characterized in its simplicity, economy and ease of assembly. Another general object is to provide a new and improved shaft connecting arrangement characterized in its simplicity, economy and ease of operation.

Other objects and advantages of the present invention will become apparent upon reading the attached detailed description taken in conjunction with the drawing.

In one form of the invention, a shaft member is provided which includes a pair of shaft sections. One of the shaft sections has an axial opening formed therein and the other shaft section has an axial extension adapted to be received in the axial opening so that the shaft sections may be disposed in abutting relationship. The axial opening and the axial extension are formed to cooperate to prevent relative rotational movement between the shaft sections. Means including a connecting member are provided to connect the shaft sections together and to prevent axial separation of the shaft sections once the shaft sections are connected together.

For the purpose of providing a detailed description of the shaft construction embodying the principles of the present invention reference will now be made to the drawing wherein;

FIG. 1 is a partial, broken away side elevational view of a shaft construction embodying the principles of the present invention;

FIG. 2 is a cross-sectional view of the shaft construction shown in FIG. 1 taken substantially along line 2—2;

FIG. 3 is a partial side elevational view of a shaft section shown in FIGS. 1 and 2; and FIG. 4 is a perspective view of an electrical component employing a shaft construction as shown in FIGS. 1–3.

While the invention has been shown and will be described in some detail with reference to a particular exemplary embodiment thereof there is no intention that it be limited to such detail. Quite to the contrary, it is intended here to embrace all modifications, alternatives, and equivalents falling within the spirit and scope of the invention as defined by the appended claims.

Referring now to the drawing, a shaft construction is shown which embodies the principles of the present invention. The shaft construction includes a pair of shafts or shaft sections 11 and 12 which are mounted in abutting relationship. Throughout the remainder of the description and the claims the term shaft sections will be employed and this term is intended to broadly include separate shafts or shaft sections forming a composite shaft. The shaft sections may be associated with a standard electronic control component 13, as shown in FIG. 4. For example, the shaft section 11 may be associated with control portions of an electrical or electronic switch and the shaft section 12 may function as a shaft extension. In the exemplary arrangement, the shaft section 11 is journaled in a bushing member 14 having an axial opening 14a centered therein through which the shaft section 11 extends. A C-washer or the like 15, received in a circumferential groove 11a of the shaft section 11, is provided for preventing movement of the shaft section 11 toward the left as viewed in FIG. 1. The bushing 14 may function to suitably secure the associated component 13 to a housing or the like (not shown) through which the shaft section 11 extends. Under these latter conditions, the housing would be disposed between the component 13 and the bushing 14.

In accordance with one aspect of the present invention the shaft section 11 is provided with an axial opening or bore 11b centered within the shaft section. Additionally, the shaft section 12 is provided with an axial extension 12a centered at one end thereof which is adapted to be received in the axial opening 11b so that the shaft sections 11 and 12 may be disposed in abutting relationship. In the exemplary arrangement the axial opening 11b and the axial extension 12a have circular cross-sections which have complementing diameters. Moreover, for the purpose of preventing relative rotational movement between shaft sections 11 and 12 and thus for the purpose of insuring that the shaft sections rotate concurrently, the axial opening 11b and the axial extension 12a are serrated, as may best be seen in FIG. 2. However, it will be readily apparent that the axial opening 11b and the axial extension 12a may take other forms wherein the serrations may not be required. For example, the axial opening and the axial extension may be rectangular in cross section or one of the shaft sections may be axially notched whereas the other shaft section may have an axial projection for cooperating with the notch.

In keeping with the present invention, the shaft section 11 is provided with a circumferential groove 11c disposed radially outwardly of a portion of the axial opening 11b. Moreover, a pair of slots 11d are formed in the circumferential groove 11c to define a pair of diametrically opposite radial apertures 11e extending into the axial opening 11b (see FIG. 3). Thus, the portion of the shaft section 11 adjacent the circumferential groove 11c has a frusto-circular cross-section as best seen in FIG. 2. Additionally, the axial extension 12a is provided with a circumferential groove 12b which is aligned with the radial apertures 11e and the circumferential groove 11c of the shaft section 11 when the shaft sections 11 and 12 are in abutting relationship shown in FIG. 1.

For the purpose of causing the shaft sections 11 and 12 to be connected together and to prevent axial separation thereof a connecting member in the form of a hairpin-shaped retainer spring 18 is received in the circumferential groove 11c in the shaft section 11 so that portions of its leg members extend through the radial apertures 11e into the circumferential groove 12b of the shaft section 12. In the exemplary arrangement the retainer spring 18 is confined within the circumferential groove 11c by the bushing 14. Thus, it will be apparent that when axial force is applied to one of the shaft sections it will be transmitted through the retainer spring 18 to the other shaft section whereby axial separation of the shaft sections 11 and 12 is prevented. Moreover, since the forward wall of the groove 12b (the left wall as viewed in FIG. 1) is straight, it will be apparent that the assembly must be disassembled in order to disconnect the shaft sections 11 and 12. Thus, a semi-permanent, tamper-proof shaft extension has been provided.

In view of the foregoing, it will be readily apparent that a new and improved shaft construction has been provided which readily facilitates connecting together a pair of shafts or shaft sections and preventing axial separation thereof once connected together. Moreover, it will be readily apparent that the shaft construction employing the principles of the present invention may be utilized for connecting together shafts of various sizes. For example, the shaft of a standard component 13, such as a switch (see FIG. 4), may be formed with a shaft corresponding to shaft section 11. On the other hand, various size and length shaft extensions may also be formed which correspond to the shaft section 12. Thereafter, when it is desired to associate a selected shaft extension with the shaft of the standard component 13, the axial extension 12a of the selected shaft extension is inserted within the axial opening 11b of the component shaft and a retainer spring or the like 18 is positioned within the circumferential groove 11c of the component shaft so that portions thereof extend through the radial apertures 11e into the circumferential groove 12b of the axial extension 12a. A bushing or the like 14 may then be positioned in place to confine the retainer spring in place and, if desired, to secure the component to a mounting plate or the like. Alternatively, a retainer spring or the like 18 may be positioned in the groove 11c of the component shaft so that portions thereof extend through the apertures 11e, and a bushing or the like 14 may be positioned in place to confine the spring retainer in place and to secure the component to a mounting plate or the like. The axial extension 12a of a shaft extension is then inserted into the axial opening 11b of the component shaft and is forced past the retainer spring 18 until the retainer spring snaps into place in the groove 12b of the axial extension 12a. To facilitate this latter assembly operation, the axial extension 12a is provided with a conic end 12c which will cam apart the legs of the spring 18 when the axial extension is forced therebetween. The bushing 14 may be suitably secured to the component, such as by a C-ring or the like 15 as shown in FIG. 4 to provide a complete unitary assembly.

What is claimed is:

1. In a shaft member, the combination which comprises a bushing, a first shaft section having an axial opening formed in one end thereof and mounted for free rotation within said bushing, a second shaft section having an axial extension at one end thereof received within the axial opening so that the shaft sections are in abutting relationship, means for preventing relative rotational movement between the shaft sections, at least one slot formed in the first shaft section within said bushing, each slot defining a radial aperture which extends into the axial opening, and means extending through each radial aperture for engaging the axial extension to prevent axial separation of the shaft sections.

2. In a shaft member, the combination which comprises a bushing, a first shaft section having an axial opening formed in one end thereof and mounted for free rotation within said bushing, a second shaft section having an axial extension formed at one end thereof received within the axial opening so that the shaft sections are in abutting relationship, means for preventing relative rotational movement between the shaft sections, a pair of slots formed in the first shaft section within said bushing to define radial apertures extending into the axial opening, a circumferential groove formed around the axial extension which is aligned with the radial apertures, and means associated with the first shaft section and extending through the radial apertures into the circumferential groove to prevent axial separation of the shaft sections.

3. In a shaft member, the combination which comprises a bushing, a first shaft section having an axial opening formed in one end thereof and mounted for free rotation within said bushing, a second shaft section having an axial extension formed at one end thereof received within the axial opening so that the shaft sections are in abutting relationship, means for preventing relative rotational movement between the shaft sections, a first circumferential groove formed in the first shaft section within said bushing adjacent the axial opening, a pair of slots formed in the first circumferential groove to define radial apertures extending into the axial opening, a second circumferential groove formed in the axial extension which is aligned with the radial apertures, and a hairpin-shaped retainer spring received in the first circumferential groove having portions thereof extending through the radial apertures into the second circumferential groove to prevent axial separation of the shaft sections.

4. In a shaft member, the combination which comprises a bushing, a first shaft section having an axial opening formed in one end thereof and mounted for free rotation within said bushing, a second shaft section having an axial extension formed at one end thereof received within the axial opening so that the shaft sections are in abutting relationship, the axial opening and the axial extension being serrated to prevent relative rotational movement between the shaft sections, a first circumferential groove formed in the first shaft section within said bushing adjacent the axial opening, a pair of slots formed in the first circumferential groove to define radial apertures extending into the axial opening, a second circumferential groove formed in the axial extension which is aligned with the radial apertures, and a hairpin-shaped retainer spring received in the first circumferential groove having portions thereof extending through the radial apertures into the second circumferential groove to prevent axial separation of the shaft sections, the inner end of said extension being tapered to tension said spring during assembly.

5. In a shaft assembly, the combination which comprises a control shaft which has an axial opening formed therein, a bushing associated with the component and having the control shaft journaled therein, a shaft extension having an axial extension received within the axial opening, means for preventing relative rotational movement between the shaft and the shaft extension, and means confined by the bushing and including a connecting member associated with the axial opening and the axial extension for preventing axial separation of the shaft and the shaft extension, the inner end of said extension being tapered whereby said connecting member is engaged by said tapered end and maintained in resilient locking engagement with said extension.

6. In a shaft assembly, the combination which comp.ises a control shaft which has an axial opening formed therein, a shaft extension having an axial extension received within the axial opening, means for preventing relative rotational movement between the shaft and shaft extension, a first circumferential groove formed in the shaft adjacent the axial opening, a pair of slots formed in the first circumferential groove to define radial apertures extending into the axial opening, a second circumferential groove formed in the axial extension which is aligned with the radial apertures, a retainer member received in the first circumferential groove having portions thereof extending through the radial apertures into the second circumferential groove to prevent axial separation of the shaft and the shaft extension, and bushing means extending from said component and rotatably supporting said shaft for confining the retainer member in the first circumferential groove.

7. In an assembly for mounting on a panel, the combination which comprises a rotary portion and a stationary portion, a bushing extending from said stationary portion and adapted for mounting in an aperture of said panel, a shaft extending from said rotary portion through said bushing and rotatable in said bushing, said shaft having an axial opening in the end thereof, a shaft extension having an axial extension of reduced cross section received within said axial opening, means preventing relative rotational movement between the shaft and the shaft extension, and resilient means confined within said bushing, extending through said shaft and engaging said shaft extension to prevent relative axial movement between said shaft and said shaft extension.

8. The assembly of claim 7 wherein the end of said extension within said axial opening is shaped to tension said resilient means upon insertion of said extension into said axial opening, and said extension has a shaped portion engageable with said resilient means to lock said shaft and shaft extension in assembled relationship.

9. The assembly of claim 8 wherein said shaft has a circumferential recess within said bushing, only portions of which extend into said axial opening, said resilient means is U shaped and disposed in said annular recess, portions thereof protruding into said axial opening, and said shaped portion of said extension has a corresponding recess engageable by said protruding portions of said resilient means to lock said shaft and shaft extension together.

References Cited

UNITED STATES PATENTS

| | | | |
|---|---|---|---|
| 192,718 | 7/1877 | Smith | 287—127 |
| 1,658,264 | 2/1928 | Sutton et al. | 285—305 |
| 2,021,241 | 11/1935 | Mall | 285—305 |
| 2,724,031 | 11/1955 | Multanen | 200—155 |
| 3,252,721 | 5/1966 | Weasler | 285—404 |
| 3,268,260 | 8/1966 | Snipe | 285—305 X |

CARL W. TOMLIN, *Primary Examiner.*

W. L. SHEDD, *Assistant Examiner.*